United States Patent [19]

Jackovitz et al.

[11] Patent Number: 4,822,698
[45] Date of Patent: Apr. 18, 1989

[54] SEAWATER POWER CELL

[75] Inventors: John F. Jackovitz, Monroeville Borough; David Zuckerbrod, Pittsburgh; Edward S. Buzzelli, Murrysville, all of Pa.

[73] Assignee: Westinghouse Electric Corp., Pittsburgh, Pa.

[21] Appl. No.: 50,179

[22] Filed: May 15, 1987

[51] Int. Cl.[4] ............................................. H01M 6/34
[52] U.S. Cl. ....................................... 429/27; 429/29; 429/118; 429/119
[58] Field of Search ................... 429/118, 119, 27, 29

[56] References Cited

U.S. PATENT DOCUMENTS

| | | |
|---|---|---|
| 3,859,136 | 1/1975 | Perry et al. |
| 3,943,004 | 3/1976 | Honer et al. |
| 3,953,238 | 4/1976 | Honer. |
| 3,966,497 | 6/1976 | Honer. |
| 4,184,008 | 1/1980 | Watakabe ..................... 429/119 X |
| 4,184,009 | 1/1980 | Armstrong ................... 429/119 X |
| 4,198,474 | 4/1980 | Shah ............................ 429/6 |
| 4,341,848 | 7/1982 | Liu et al. ..................... 429/44 X |
| 4,435,487 | 3/1984 | Supelak ....................... 429/70 |
| 4,444,852 | 4/1984 | Liu et al. ..................... 429/29 |
| 4,601,961 | 7/1986 | McCartney .................. 429/119 |

*Primary Examiner*—Stephen J. Kalafut
*Attorney, Agent, or Firm*—Daniel P. Cillo

[57] ABSTRACT

Disclosed is a battery having an anode selected from the group consisting of magnesium, zinc, and mixtures and alloys thereof, an oxygen electrode as the cathode, and means for maintaining the anode and the cathode in an electricity-generating relationship when the battery is placed in salt water. Also disclosed is a method of producing electricity by positioning the anode and cathode in a saline electrolyte whereby the reaction $$M + 2OH^- \rightarrow M(OH)_2 + 2e^-$$

occurs at the anode and the reaction $$O_2 + 2H_2O + 4e^- \rightarrow 2OH^{31}$$

occurs at the anode, where M is magnesium, zinc, aluminum, or mixtures or alloys thereof.

6 Claims, 2 Drawing Sheets

SEAWATER POWER CELL

BACKGROUND OF THE INVENTION

In an alkaline battery an air electrode cathode and a metal anode, such as iron or zinc, are spaced apart in an alkaline solution. Air diffuses into the air electrode where oxygen is reduced, releasing hydroxide ions into the alkaline solution, resulting in the generation of electricity. While this type of battery is rechargeable, it can be used only in alkaline solutions. Since seawater is neutral, or nearly neutral, alkaline batteries will not function with seawater as the electrolyte.

Batteries commonly used with seawater as the electrolyte employ an anode of magnesium and a cathode of copper chloride or silver chloride. These batteries function according to the following equations:

| At the anode: | $Mg + 2Cl^- \rightarrow MgCl_2 + 2e^-$ |
|---|---|
| At the cathode: | $2MCl + 2e^- \rightarrow 2M + 2Cl^-$ |
| Overall reaction: | $Mg + 2Cl^- \rightarrow MgCl_2$ | where M is copper or silver. These batteries are generally heavy and require a large amount of space. For example, an Mg/CuCl battery that can generate one watt year might be 8 to 8½ feet long, about 9 inches in diameter, and weigh more than 100 pounds. Moreover, that battery has limited flexibility in design and is generally limited to this elongated shape.

In order to power undersea detection and monitoring devices, it is necessary to have small, light-weight batteries that will function reliably for at least one year, and that can be made in shapes compatible with the remainder of the device.

SUMMARY OF THE INVENTION

We have discovered a new power cell or battery for use in seawater. Our battery functions according to new electrochemical reactions that involve magnesium or zinc as an anode and an oxygen electrode as the cathode. The battery of this invention is a primary cell that will operate in seawater and cannot be recharged. Compared to the Mg/CuCl or Mg/AgCl seawater batteries, the battery of this invention is very light, typically weighing only about 25 pounds per watt year of electricity generated. In addition, the space occupied by a comparable battery according to this invention is much less, and the battery of this invention can be made in almost any arbitrary shape. The battery is constructed from relatively inexpensive materials, such as magnesium or zinc, and is not difficult to fabricate.

A major advantage of the battery of this invention, where zinc is used as the anode, is that no bubbles are generated by the battery and therefore it is completely silent. This is an important consideration when the battery is used to power an underwater listening device because bubbles emanating from the battery would be detected by the device as acoustic noise.

DESCRIPTION OF THE INVENTION

Figure 1:
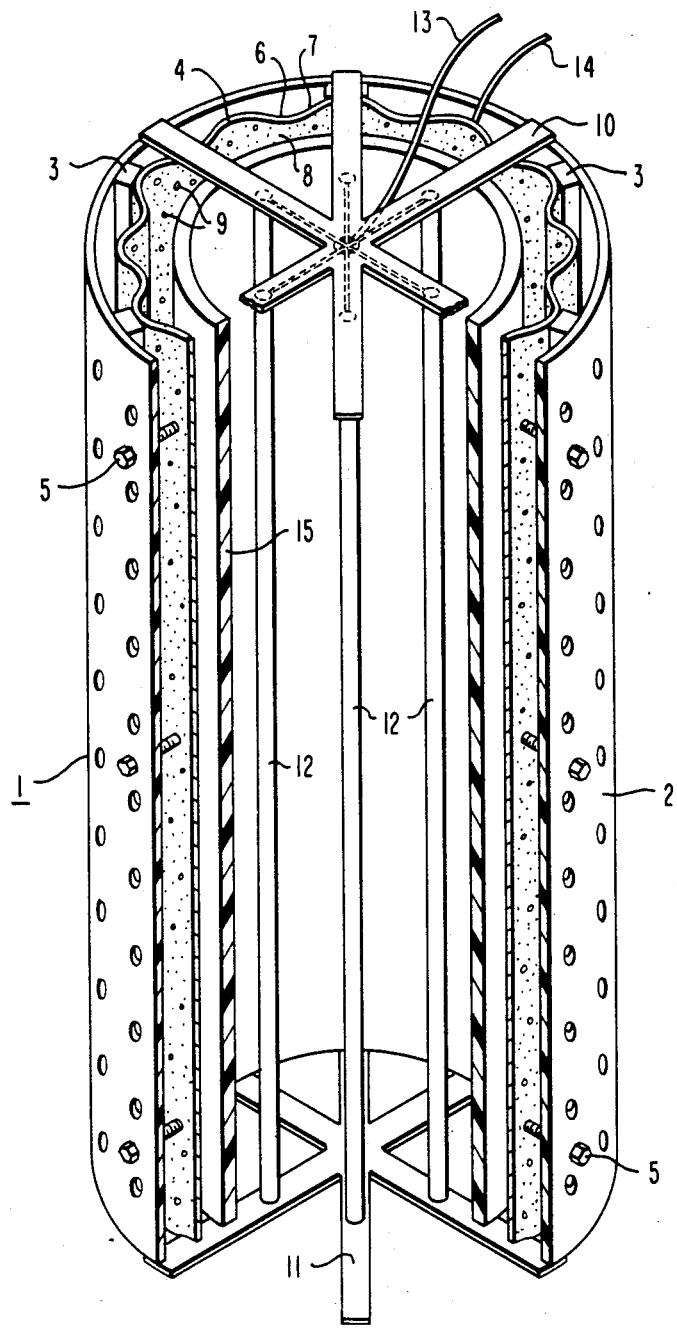
FIG. 1 is an isometric view partially in section illustrating a certain presently preferred embodiment of a seawater battery according to this invention.
Figure 2:
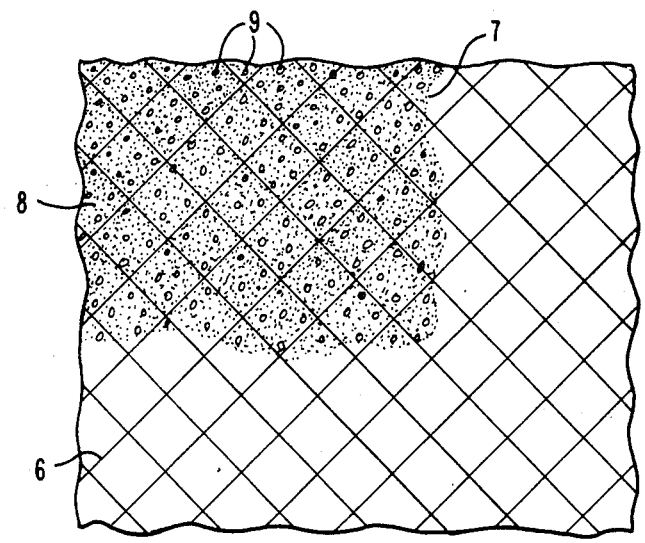
FIG. 2 is an enlarged side view of a section of the cathode shown in FIG. 1.

In the FIGS. 1 and 2, seawater battery 1 consists of cylindrical porous non-conducting casing 2 having multiple internal non-conducting spacers 3. Within the casing is an oxygen electrode cathode 4 which is bolted to the casing by means of nylon bolts 5. Cathode 4 consists of a metal screen 6, which acts as a current collector, inside a porous binder 7, which contains particles 8 of carbon on which are embedded particles of catalyst 9. Mountings 10 and 11 of non-conducting material at each end of the battery 1 hold a single or multiple anode rods 12 which contain magnesium or zinc. A current collector 13 collects the current from anode rods 12, and a second current collector 14 collects the current from screen 6. A polymeric separator 15 between anode rods 12 and cathode 4 protects cathode 4 from fouling due to magnesium ions produced during battery operation.

The oxygen electrode is similar to air electrodes used in other batteries in several ways, and reference may be made to the air electrode art for assistance in constructing the oxygen electrode of this invention. See, for example, U.S. Pat. Nos. 4,152,489; 4,444,852; 4,448,856; and 4,341,848, herein incorporated by reference. Briefly, the oxygen electrode consists of a current collector which is embedded in a porous, catalyst-containing matrix. The current collector is a screen made of a material that is a good conductor and is non-corrodable in seawater. Preferred materials include silver and silver-plated metals such as nickel, though other conducting materials can also be used.

The matrix material, in which the current collector is embedded, typically consists of a binder, a catalyst, and carbon. Suitable binders include plastics that are stable in seawater, such as polytetrafluoroethylene, nylon, polypropylene, polyethylene, and phenolic resin. The binder is used as either a powder or, preferably, as a suspension in water. The binder particles typically have a particle size of about 1,000 to about 10,000 angstroms. Catalysts include noble metals, such as platinum, silver, and palladium, and metal macrocyclics (metal complexes or chelates). Platinum and silver are the preferred catalysts as they are very active. The carbon that is present performs the functions of supporting the catalyst in the air electrode and of conducting current from the catalyst to the current collector.

The matrix material is made by blending the binder, the catalyst, the carbon, and a pore former. The pore former performs the function of generating a gas during the preparation of the matrix material to create pores in the matrix material, permitting the electrolyte to enter the oxygen electrode. While many pore formers are known in the art, ammonium bicarbonate is preferred as it decomposes entirely into the gases carbon dioxide and ammonia, and therefore does not leave a residue and is not present in the final product.

The matrix material can be prepared using, for example, 0.2 to about 0.8 mg per $cm^2$ of cathode surface (i.e., the projected area of the cathode) of a catalyst, about 30 to about 70% by weight (based on catalyzed carbon plus binder weight) of a binder, about 0.5 to about 15% by weight (based on catalyzed carbon plus binder plus pore former weight) of a pore former, and about 70 to about 30% by weight (based on catalyzed carbon plus binder weight) of carbon. The amount of carbon used should be approximately 100% by weight (based on catalyzed carbon plus binder weight) minus the percentage of binder. The amount of carbon is preferably about 60 percent, and the amount of binder is preferably about 40 percent. If less catalyst is used the performance of the battery will be poorer, and more catalyst is usually unnecessary. If less binder is used the matrix may fall apart and wash away, and more binder is unnecessary and may reduce battery performance. Less pore former may reduce battery performance and more may result in the erosion of the matrix material. If more carbon is used the matrix material may erode and if less carbon is used the performance of the battery may decline.

The blend of matrix materials is extruded into sheets about 5 to about 15 mils thick. A sheet is placed on each side of the current collector and is hot pressed into the current collector, fusing the binder particles, forming a solid coherent mass that is nevertheless porous. While thinner sheets can be used, they are difficult to process, and thicker sheets should be avoided as they add weight to the battery and perform no useful function. The oxygen electrode can be formed into a cylinder by spot welding the ends together. The cylinder is placed within a casing and is fastened in place. The magnesium or zinc rods are placed in the mountings at the end of a cylinder and the mountings are fastened to the casing. The battery is sprayed with a surfactant in a solution; the solvent in the solution evaporates, leaving the surfactant as a dry chemical on the battery where it remains until the battery is placed in seawater. Finally, the current collectors are attached and the battery is finished.

When placed in seawater, the following electrochemical reactions occur:

| | |
|---|---|
| At the anode: | $M + 2OH^- \rightarrow M(OH)_2 + 2e^-$ |
| At the cathode: | $O_2 + 2H_2O + 4e^- \rightarrow 4OH^-$ |
| Overall reaction: | $M + \frac{1}{2}O_2 + H_2O \rightarrow M(OH)_2$ | where M is magnesium, zinc, or a mixture or alloy thereof. As the above equations indicate, the magnesium or zinc in the anode is gradually depleted, producing a hydroxide waste product which diffuses out of the cell. In addition, a self-discharge reaction can occur when magnesium is present in the anode:

$$Mg + 2H_2O \rightarrow Mg(OH)_2 + H_2 \uparrow$$

The self-discharge reaction is destructive because magnesium is consumed but electricity is not generated. Also, the bubbles of hydrogen that are formed can be detected as noise by a sensor. However, the use of magnesium-rich alloys can reduce the above reaction so that less than 10% of the magnesium is lost in self-discharge. Self-discharge and the generation of bubbles can be avoided entirely by using a zinc anode, though zinc anodes have the disadvantage of generating about 300 millivolts less potential than do magnesium anodes.

The anode material of this invention is limited to magnesium, zinc, aluminum, and mixtures and alloys thereof; magnesium, zinc, and mixtures and alloys thereof are preferred as they perform more reliably. A magnesium anode is preferably made of a magnesium-rich alloy such as "AZ-61," an alloy of magnesium containing 6% aluminum and 1% zinc, which has a low corrosion rate, or "M1C," a magnesium alloy containing 1% manganese. A zinc anode is preferably made entirely of zinc.

The batteries cannot be used in alkaline solutions, but only in solutions that are pH neutral (i.e., solutions having a pH of about 6.5 to about 7.5). While the battery will generate electricity in fresh water, its performance is better in salt water (i.e., water that has a salinity of about 2.2 to about 3.5%).

The batteries can be made in any shape including cylindrical, rectangular, square, or a shape that conforms to the particular device that the battery powers. However, a cylindrical shape, as shown in the drawing, is preferred as it presents the best trade-off of long-term performance, size, and weight.

The following is a comparison of the electrochemical reactions of the Mg/CuCl and Mg/AgCl batteries with the electrochemical reactions of the batteries of this invention in 3% NaCl using 1,300 ppm Mg at a pH of 7.

| Reaction | ΔE (Volts) | Equivalent Wt (g) | Theoretical Energy Density (Wh/kg) |
|---|---|---|---|
| $Mg + 2CuCl \rightarrow Mg^{+2} + 2Cu + 2Cl^-$ | 2.559 | 111 | 681 |
| $Mg + 2AgCl \rightarrow Mg^{+2} + 2Ag + 2Cl^-$ | 2.652 | 155 | 459 |
| $Mg + \frac{1}{2}O_2 + H_2O \rightarrow Mg + 2 + 2OH^-$ | 3.216 | 12.2 | 7070 |

In a real device, of course, the theoretical energy density is never achieved. This is due to self-discharge, incomplete removal of products, and the need for current collectors and cell structural members. Nevertheless, the above table shows that the battery of this invention is far superior to conventional seawater batteries.

The following examples further illustrate this invention.

EXAMPLE

A seawater battery according to this invention was made using, as an anode, a magnesium cylinder 1¼ inches in diameter and 6 inches long having the composition 6% Al, 3% Zn and 91% Mg ("AZ63"). The anode contained an iron wire in its center as the current collector. This wire was connected via the current collector to a long plastic coated wire by soldering and the junction of the current collector and the conducting wire was potted with epoxy.

The oxygen cathode for the battery was made by annealing a pure silver, expanded metal screen 6.5 inches high and 21 inches long, in hydrogen at 350° C. for 3 hours, to increase its workability. Catalyst layers were prepared from a matrix of 0.5 mg/cm² platinum catalyst, 50% polytetrafluoroethylene, 50% catalyzed carbon, and 7% ammonium bicarbonate pore former. The screen was then sandwiched between two catalyst layers and hot pressed in nitrogen at 330° C. for ½ hour. This resulted in a firm attachment of the polytetrafluoroethylene based catalyst layers to the screen. The flat screen was then fashioned into a cylinder and a silver strap current collector was welded to the screen the entire length of the cylinder.

The cathode cylinder was then supported using a formed cylinder of expanded plastic screen. The top and bottom frames of the battery were constructed from "Plexiglass" sheets in a cross-like fashion. The center portion of the cross was indented at top and bottom to firmly house the 1¼ inch diameter anode. A concentric separator layer of "Silverguard SG30," a polymeric film that prevents magnesium ions from going to the cathode, was placed about ¾ inch from the anode. The cathode was about 800 cm² in area and the battery was rated to deliver about 1.5 volts at 50 mA drain. The data obtained in air saturated seawater over a one month period is shown below:

| Day | Volts | Load, mA | pH of Electrolyte |
|---|---|---|---|
| 1 | 1.46 | 50 | 6.5 |
| 3 | 1.47 | 46 | 6.8 |
| 5 | 1.46 | 53 | 7.1 |
| 10 | 1.45 | 51 | 6.7 |
| 15 | 1.47 | 48 | 6.6 |
| 20 | 1.46 | 47 | 7.0 |
| 25 | 1.45 | 49 | 6.9 |
| 30 | 1.46 | 48 | 6.8 |

The above data shows that the battery has stable properties over the period tested.

We claim:

1. A seawater activated battery comprising
  (A) a porous casing of inert material;
  (B) an oxygen electrode as a cathode fixed inside and spaced apart from said casing;
  (C) an anode selected from the group consisting of magnesium, zinc, and mixtures thereof, said anode being fixed inside said oxygen electrode, spaced therefrom; and
  (D) means for collecting current from said anode and said cathode.

2. A battery according to claim 1 wherein said anode is a magnesium rich alloy.

3. A battery according to claim 1 wherein said anode is zinc.

4. A battery according to claim 1 wherein said anode is a plurality of rods.

5. A battery according to claim 1 wherein said air electrode comprises a current collector imbedded in a matrix which comprises:
  (1) about 30 to about 70% by weight of a porous, inert, hydrophobic plastic;
  (2) about 0.2 to about 0.8 mg/cm² of a catalyst;
  (3) about 70 to about 30% carbon.

6. A battery according to claim 1 wherein said anode is aluminum.

* * * * *